March 22, 1927.

J. T. BACON 1,621,865

TRAVELER'S CHECK

Filed June 15, 1926     3 Sheets-Sheet 1

WITNESSES:

Alfred E. Oschinger.

George A. Gruss

INVENTOR:
John T. Bacon,

BY Joshua R. H. Potts
ATTORNEY.

March 22, 1927.

J. T. BACON 1,621,865

TRAVELER'S CHECK

Filed June 15, 1926

3 Sheets-Sheet 2

WITNESSES:
Alfred E. Lichinger
George A. Gruss

INVENTOR:
John T. Bacon,
BY Joshua R H Toth
ATTORNEY

March 22, 1927.　　　　　　　J. T. BACON　　　　　　　1,621,865
TRAVELER'S CHECK
Filed June 15, 1926　　　3 Sheets-Sheet 3

WITNESSES:
Alfred E. Ischinger
George A. Gruss

INVENTOR:
John T. Bacon,
BY Joshua R. H. Potts
ATTORNEY.

Patented Mar. 22, 1927.

1,621,865

UNITED STATES PATENT OFFICE.

JOHN T. BACON, OF WILLIAMSPORT, PENNSYLVANIA.

TRAVELER'S CHECK.

Application filed June 15, 1926. Serial No. 116,067.

This invention relates to travelers' or bankers checks.

When a traveler's check is issued it is signed by the payee in the presence of the issuing clerk and when cashed it is countersigned by the payee in the presence of the payor to show the payor that the signatures correspond and were both signed by the payee, thereby proving that the payee is the rightful owner of the check. This is the usual system of issuing and cashing travelers' checks and was intended to prevent unscrupulous persons from forging the check.

The objection to checks issued and cashed in this manner is that it is a comparatively easy matter for an unscrupulous person, who obtains possession of the check, to copy and counterfeit the signature of the rightful owner and then forge the check.

The objects of my invention are to provide a check from which it is practically impossible to copy and counterfeit the signature of the rightful owner; on which the signature is concealed in such manner that it cannot be exposed without marring or mutilating the check to such degree as to be easily detected, and which becomes void when the seal concealing the signature is broken.

These objects, and other advantageous ends which will be described hereinafter, I attain in the following manner, reference being had to the accompanying drawings in which—

Figure 4:
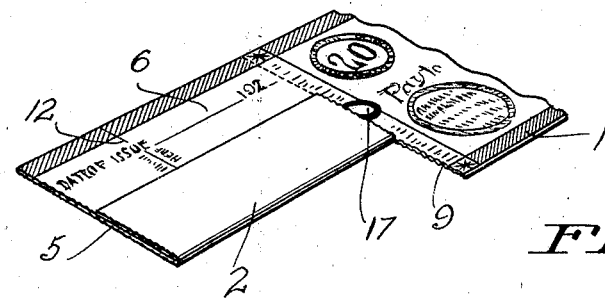
Figure 5:
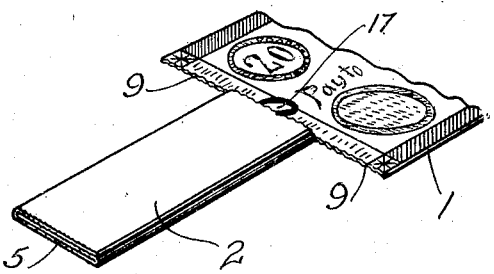
Figure 6:
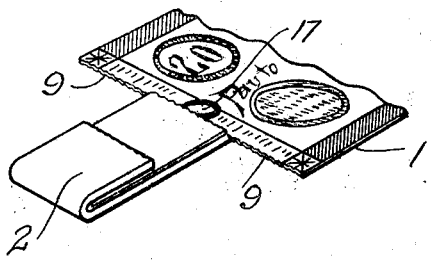
Figure 7:
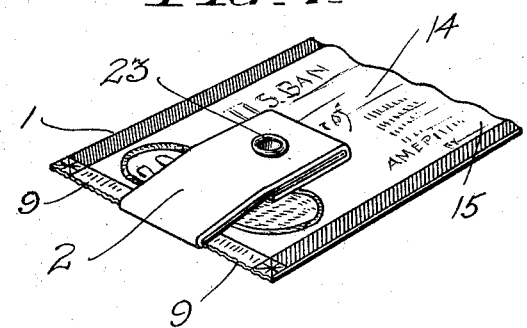

Figure 1 is a face view of a check made in accordance with my invention before it is issued, Figure 2 a like view showing the check after being issued, Figure 3 a fragmentary face view of the check showing the manner in which the issuing stub is detached, Figure 4 a fragmentary perspective view of the check showing one step of folding the stub to conceal the payee's signature, Figure 5 a like view showing the second step, Figure 6 a similar view showing the third step, Figure 7 a similar view showing the fourth step with a modified form of means for securing the folded stub to the body part of the check, and Figures 8, 9, 10 and 11 other modified forms of means for securing the folded stub to the body of the check.

Referring to the drawings, 1 indicates the body part of the check, 2 the signature concealing stub and 3 the issuing stub.

The issuing stub has spaces 4 thereon in which the date of issue and the name and address of the person to whom the check is issued, are written by the issuing clerk who signs his name in the space indicated. This stub is integral with the name concealing stub and is separated therefrom by a scored line 5 along which stub 3 is detached.

The signature concealing stub, hereinafter called concealing stub, may have printed matter thereon of any desired character, preferably as shown which includes the space 6 in which the date of issue is written, a space 7 in which the person to whom the check will be issued, hereinafter called the payee, places his signature, and a space 8 in which the cashier of the institution issuing the check writes his signature. This stub is scored partway from the edges toward the center as indicated by the dotted lines 9 so that the stub may be torn along these lines and is then folded on the lines 10 and 11. The left hand end of the folded stub is then folded substantially in the position indicated by line 12 which may also appear on the rear of the concealing stub and on a line 13 onto body part 1 to be secured thereto.

The body part 1 may have printed matter thereon of any desired character preferably as shown which includes a space 14 in which the payee writes his signature, and spaces 15 and 16 in which officers of the issuing institutions place their signatures. A space 17 is preferably provided on the body part for receiving a light re-acting chemical which is applied to the space at the time the check is issued and which will be sealed against light by the concealing stub.

Figure 8:
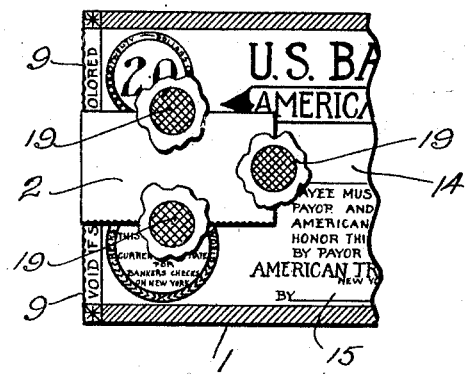
Figure 9:
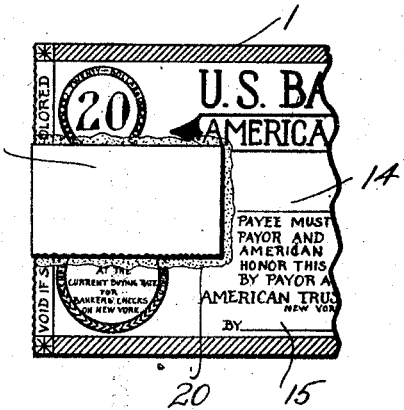
Figure 10:
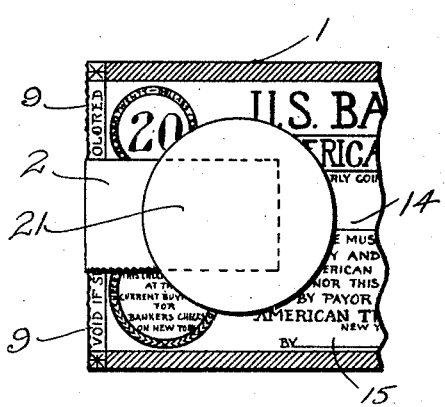
Figure 11:
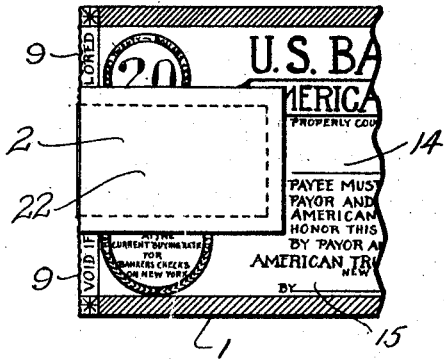

The concealing stub when folded onto the body part may be secured and sealed thereto by a plain strip sticker 18 shown in Figure 2, or a series of wax-stamps 19 shown in Figure 8, or glue 20 shown in Figure 9, or a stamp 21 as shown in Figure 10 which may be marked with the seal of the issuing institution, or a stamp 22 which is glued around the entire free edges of the folded concealing stub as shown in Figure 11, or a rivet 23 as shown in Figure 7 which passes through the folded concealing stub and the body part and which may be in the form of an eyelet, staple, or any other type of metallic fastener which is upset or bent in order to secure the same.

When a check is issued, the date and the name and address of the person to whom the check will be issued, are written in the spaces 4 of the issuing stub which is then signed by the issuing officer. The date of issue is then written in the space 6 of the concealing stub after which the payee writes his signature in the space 7 in the presence of the issuing clerk. The cashier of the institution issuing the check then places his signature in the space 8. The issuing stub is then detached from the concealing stub along the scored line 5 and the concealing stub is partly detached from the body part 1 along the lines 9. If the light re-acting chemical is used, the issuing clerk then places the light re-acting chemical in the space 17 and folds the concealing stub along the lines 10, 11, 12 and 13 as shown in Figures 4, 5, 6, 3 and 7, after which the folded stub may be sealed and secured to the body part in any one of the ways shown in Figures 3, 7, 8, 9, 10 and 11. The payee then receives the check and may cash the same where such checks are recognized, by writing his signature in the space 14 in the presence of the payor who will then break the seal and open the concealing stub to compare the signature and inspect the light re-acting chemical. If the signatures compare favorably and the chemical is not discolored, the payor is assured that the person presenting the check is the rightful owner and will pay the amount of the check.

If for any reason any unscrupulous person obtains possession of the check, it will be practically impossible for that person to see or copy the signature of the payee for counterfeiting purposes unless the seal of the folded stub is broken. Should said person break the seal, it will mutilate or mar the check and when presented to the payor may be readily detected. The payor knowing the check has been tampered with, will refuse payment because the person presenting the check may not be the rightful owner.

If, however, the person presenting the check signs the name of the payee in the space 14 and the check does not appear to be marred, the payor upon breaking the seal will inspect the light re-acting chemical in space 17 and if it is discolored, even though the signatures of said person and the payee compare favorably, the payor should refuse payment, because the person presenting the check has tampered with the seal and may not be the rightful owner.

As an additional safeguard the name of the payee may be written with a chemical known as invisible ink which may be exposed only by passing the stub over a flame and subjecting the signature to its heat. Once exposed the signature remains exposed and the check with an exposed signature will not be cashed.

If desired the payee's signature may be written with the same light re-acting chemical as is placed in the space 17 which will discolor when exposed to light. This will indicate that the stub has been tampered with and therefore renders the check void.

It will be seen from the foregoing that I have provided a check which carries and conceals the payee's signature in such manner that it is practically impossible for an unscrupulous person obtaining possession of the check to counterfeit the signature and forge the check without detection.

While I have described my invention as taking a particular form, it will be understood that the various parts may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A check including a body part provided with a space appropriately designated for the signature of the payee; a concealing stub integral with said part and having a space appropriately designated for the payee's signature, a space on the body of said check appropriately designated to receive a light re-acting chemical, said stub being partially scored and thereby adapted to be folded to conceal the signature and said chemical, and means for fastening the folded stub to the body part.

2. A check including a body part provided with a space appropriately designated for the signature of the payee; a concealing stub integral with said part and having a space appropriately designated for the payee's signature and a space appropriately designated to receive a light re-acting chemical and scored lines extending partway from the opposite edges toward the center of the stub whereby the stub may be partly detached and folded to conceal the signature and said light re-acting chemical, and means for fastening the folded stub to the body part.

3. A check including a body part provided with a space appropriately designated for the signature of the payee; a concealing stub integral with said part and having a space appropriately designated for the payee's signature and a space appropriately designated to receive a substance having a certain appearance under certain conditions and another appearance under changed conditions brought about by exposure to light, said stub being scored along a portion of its surface thereby enabling it to be folded to conceal the signature and said substance, and means passing through the folded stub and the body part for securing the stub thereto.

4. A check including a body part provided with a space appropriately designated for the signature of the payee; a concealing stub integral with said part and having a space appropriately designated for the payee's signature, a space on said body and stub appropriately designated to receive a substance having a certain appearance when concealed from the light and another appearance when exposed to the light, said stub having scored portions therey adapting it to be folded to conceal the signature and said substance, and a rivet passing through the folded stub and the body part for securing the stub thereto.

In testimony whereof I have signed my name to this specification.

JOHN T. BACON.